(12) United States Patent
Fatt et al.

(10) Patent No.: US 8,872,417 B2
(45) Date of Patent: Oct. 28, 2014

(54) SOCKET ADAPTOR HAVING AC-DC CONVERTOR FOR LED LAMP

(75) Inventors: Chew Tong Fatt, Penang (MY); Sidney Chun Kit Chu, Kowloon (HK)

(73) Assignee: GT Biomescilt Light Limited, Kowloon (HK)

( * ) Notice: Subject to any disclaimer, the term of this patent is extended or adjusted under 35 U.S.C. 154(b) by 99 days.

(21) Appl. No.: 13/166,368

(22) Filed: Jun. 22, 2011

(65) Prior Publication Data

US 2012/0326623 A1   Dec. 27, 2012

(51) Int. Cl.
| | |
|---|---|
| H01J 5/48 | (2006.01) |
| H01J 5/50 | (2006.01) |
| H01R 13/717 | (2006.01) |
| H05B 33/08 | (2006.01) |
| H01R 13/66 | (2006.01) |
| H01R 33/945 | (2006.01) |

(52) U.S. Cl.
CPC ........ H01R 13/7175 (2013.01); H05B 33/0803 (2013.01); Y02B 20/383 (2013.01); H01R 13/6675 (2013.01); Y02B 20/19 (2013.01); H01R 33/9453 (2013.01)
USPC ...... 313/318.01; 313/498; 313/506; 313/512; 439/226; 439/236

(58) Field of Classification Search
CPC ....... F21K 9/00; F21K 9/1355; F21K 9/1375; F21V 3/02; F21V 23/02; F21Y 2101/02; H02J 9/065; H02J 9/62
USPC ............. 313/498–512, 318.01; 439/226, 236, 439/699.2; 362/362, 294, 373, 249.01
See application file for complete search history.

(56) References Cited

U.S. PATENT DOCUMENTS

| | | | |
|---|---|---|---|
| 2006/0098440 A1* | 5/2006 | Allen | 362/294 |
| 2008/0062703 A1* | 3/2008 | Cao | 362/311 |
| 2010/0109558 A1 | 5/2010 | Chew | |
| 2010/0117550 A1* | 5/2010 | Lee et al. | 315/250 |
| 2010/0118555 A1 | 5/2010 | Lee | |
| 2010/0176744 A1* | 7/2010 | Lee et al. | 315/294 |
| 2010/0197157 A1* | 8/2010 | Wang | 439/275 |
| 2011/0193112 A1* | 8/2011 | Inoue et al. | 257/91 |
| 2011/0227510 A1* | 9/2011 | Elberbaum | 315/363 |
| 2011/0279033 A1 | 11/2011 | Yang et al. | |

FOREIGN PATENT DOCUMENTS

| | | |
|---|---|---|
| KR | 20100052976 A | 5/2010 |
| KR | 20100052978 A | 5/2010 |

OTHER PUBLICATIONS

Notification of Transmittal of the International Search Report and Written Opinion of the International Searching Authority, mailed on Nov. 1, 2012.
International Preliminary Report on Patentability issued in International Application No. PCT/IP2012/001217 mailed Jan. 9, 2014.

* cited by examiner

*Primary Examiner* — Britt D Hanley
*Assistant Examiner* — Kevin Quarterman
(74) *Attorney, Agent, or Firm* — McDermott Will & Emery LLP (57) ABSTRACT

A socket adaptor for an LED lamp includes an adaptor body and an AC-DC converter disposed in the adaptor body. The adaptor body includes a holder for receiving an LED lamp, the holder being configured according to industrial standards. The adaptor body also includes an external base for attaching the socket adaptor to a lamp holder, the external base being configured according to the industrial standards.

20 Claims, 9 Drawing Sheets

SOCKET ADAPTOR HAVING AC-DC CONVERTOR FOR LED LAMP

TECHNICAL FIELD

The present disclosure relates to a socket adaptor for a light emitting diode (LED) lamp. More particularly, the socket adaptor includes a built-in AC-DC convertor.

BACKGROUND

A socket adapter for conventional light bulbs (incandescent light bulbs) have a larger external screw base, combined with an internal, smaller screw socket, so that a light bulb having a small screw socket is adapted to a large receiving socket (i.e., a lamp holder). Such a socket adaptor does not usually include any built-in power adapter because the conventional light bulb does not generally require any conversion of electric power.

Recently, an LED light bulb has been developed and has become popular as a replacement of an incandescent light bulb, because of its low power consumption and long life characteristic. An LED can be driven by AC or DC power. In an AC mode, the LED does not light up in a reverse cycle of the AC power. When the AC power is rectified, the LED can be lit up in a full-wave rectified alternating DC mode. For a DC mode, the AC power should be converted to DC power, and therefore an AC-DC converter that converts AC current to DC current is necessary.

There are two known methods for providing DC power to an LED lamp. One method is providing an AC-DC convertor (a DC power supply) in the LED lamp itself. In such a case, heat will build-up in the LED lamp due to the presence of both the DC power supply and the LED lamp, and cost of the LED lamp will increase. Further, it will be necessary to replace the entire LED lamp together with the AC-DC convertor if either one of the LED lamp or the AC-DC convertor fails.

Another method is providing an external AC-DC convertor (DC power supply), for example, in a wall switch or in a lighting fixture. This method avoids the heat build-up in the lamp. Since the increase in temperature in the LED lamp will reduce the efficiency of the LED, such as an external convertor may be desirable in terms of the efficiency of the LED lamp. The external AC-DC convertor, however, frequently requires a box for housing the convertor and a driver circuit, an AC power inlet and a DC output cable, which reduces flexibility of installment of the LED lamps. Having a separately attached AC-DC power convertor is also troublesome since it requires the end-user to install and hide the power supply somewhere away from the LED lamps. This involves additional installment cost.

An example of an external AC-DC convertor for LED lamps is found in U.S. Patent Application Publication No. 2010/0109558, the entirety of which is incorporated herein by reference.

Accordingly, there is a need for a compact and low cost AC-DC conversion system for an LED lamp as a replacement of an incandescent light bulb, which overcomes the foregoing problems.

SUMMARY

In order to solve one or more of the foregoing problems associated with the conventional AC-DC conversion system for an LED lamp, the present disclosure addresses one or more of the foregoing needs for an AC-DC conversion system for the LED lamp which is compact and low cost.

In one exemplary embodiment, a socket adaptor for an LED lamp includes an adaptor body and an AC-DC converter disposed in the adaptor body. The adaptor body may include a holder having an internal thread for receiving an external thread of an LED lamp. The adaptor body may further include an external thread for attaching the socket adaptor to a lamp socket. The adaptor body may further include an outer base contact disposed at an end of the socket adaptor, and the outer base contact and the external thread are configured to receive AC power.

The adaptor body may include a GU standard base for attaching the socket adaptor to a GU standard lamp socket, and the adaptor body may further include an outer base contact disposed at an end of the socket adaptor, and the outer base contact and the external thread are configured to receive AC power. The GU standard base may include a first terminal and a second terminal configured to receive AC power.

In any of the above socket adaptors, the holder may further include an inner base contact, and the inner base contact and the internal thread are configured to provide DC power to the LED lamp. Further, in any of the above socket adaptors, the adaptor body may include a bi-pin holder having two holes for receiving a bi-pin electrode of an LED lamp. The adaptor body may further include an external thread for attaching the socket adaptor to a lamp socket or a GU standard base for attaching the socket adaptor to a GU standard lamp socket.

In any of the above socket adaptors, the AC-DC convertor includes a diode-based rectifier and a wave-shaping circuit, and the AC-DC convertor is configured to provide a pulsed DC current. The AC-DC convertor may further include a voltage surge protector and an over-current limiter. The AC-DC convertor may be disposed on a circuit board, and the circuit board may be sealed by an insulating material in the adaptor body. The insulating material may be, for example, epoxy or silicone.

In any of the above socket adaptors, the external thread may have crimping dimples.

In the socket adaptor according to one example of the present disclosure, the adaptor body includes a holder for receiving an LED lamp and the holder is configured according to industrial standards. The adaptor body also includes an external base for attaching the socket adaptor to the lamp holder and the external base is configured according to the industrial standards.

In another example, a lamp system includes any of the above socket adaptors, and an LED lamp coupled to the socket adaptor. The LED lamp is driven by a DC current provided by the socket adaptor.

The socket adaptor of the present disclosure, together with further objects and advantages, can be better understood by reference to the following detailed description and the accompanying drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
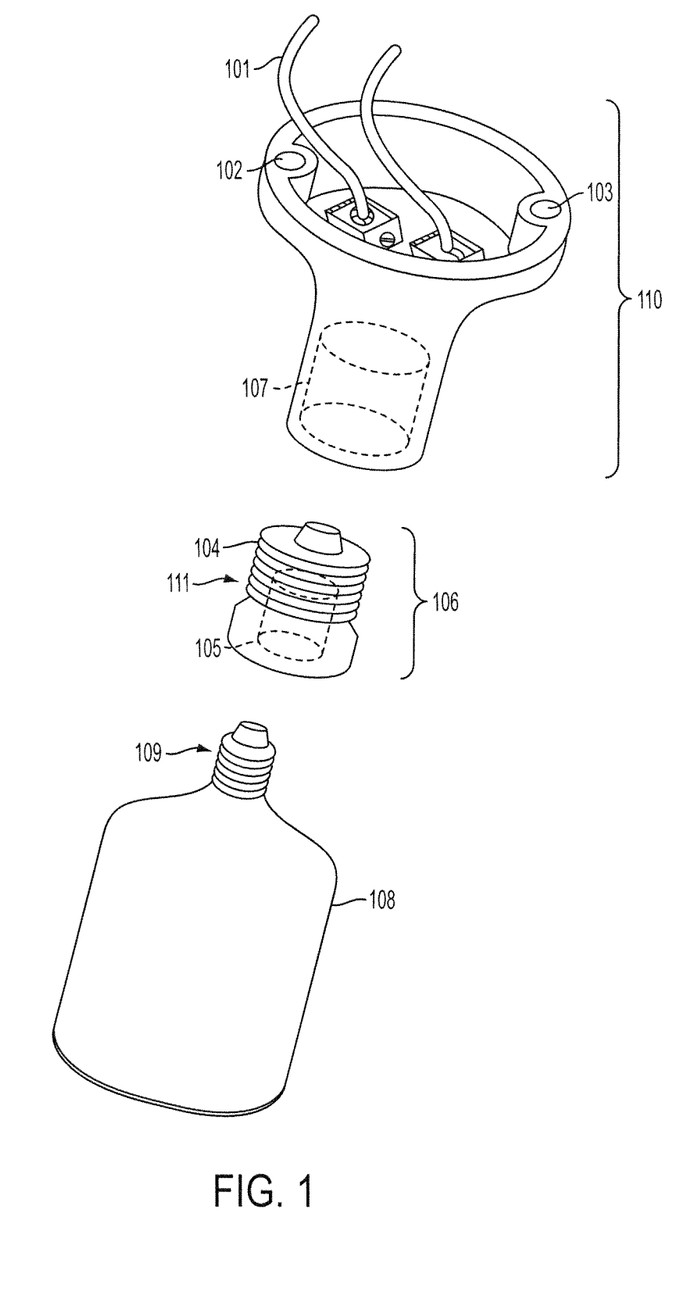
FIG. 1 shows an exemplary view of a socket adaptor according to one embodiment of the present disclosure, together with an LED light bulb and a lamp holder.

FIG. 1 shows an exemplary view of a socket adaptor according to one embodiment of the present disclosure, together with an LED light bulb and a lamp holder. A screw base socket adapter 106 includes an AC-DC convertor/power supply. An LED lamp 108 having an LED lamp screw base (e.g., an external thread) 109 is connectable to one end of the socket adaptor 106. The other end of the socket adaptor 106 is connectable to a lamp holder 110 which is connected to an AC power supply through a power cable 101.

The lamp holder (a lamp socket) 110 has a lamp holder screw socket (e.g., an internal thread) 107, and fixing holes 102 and 103 for fixing the lamp holder to, for example, a ceiling.

The socket adaptor 106 includes a socket body 111 having an adaptor base (e.g., an internal thread) 105 for receiving the LED lamp screw base 109, and an adaptor screw base (e.g., an external thread) 104 for attaching the socket adaptor 106 to the lamp holder 110. The socket adaptor 106 includes a built-in AC-DC convertor so that the AC power provided through the lamp holder 110 is converted to DC power for driving the LED lamp 108.

In this example, the diameter of the adaptor base 104 is smaller than the diameter of the lamp holder screw socket 107. The adaptor base 104 and lamp holder screw socket 107 are the E-type base-socket (i.e., Edison base-socket).

Figure 2:
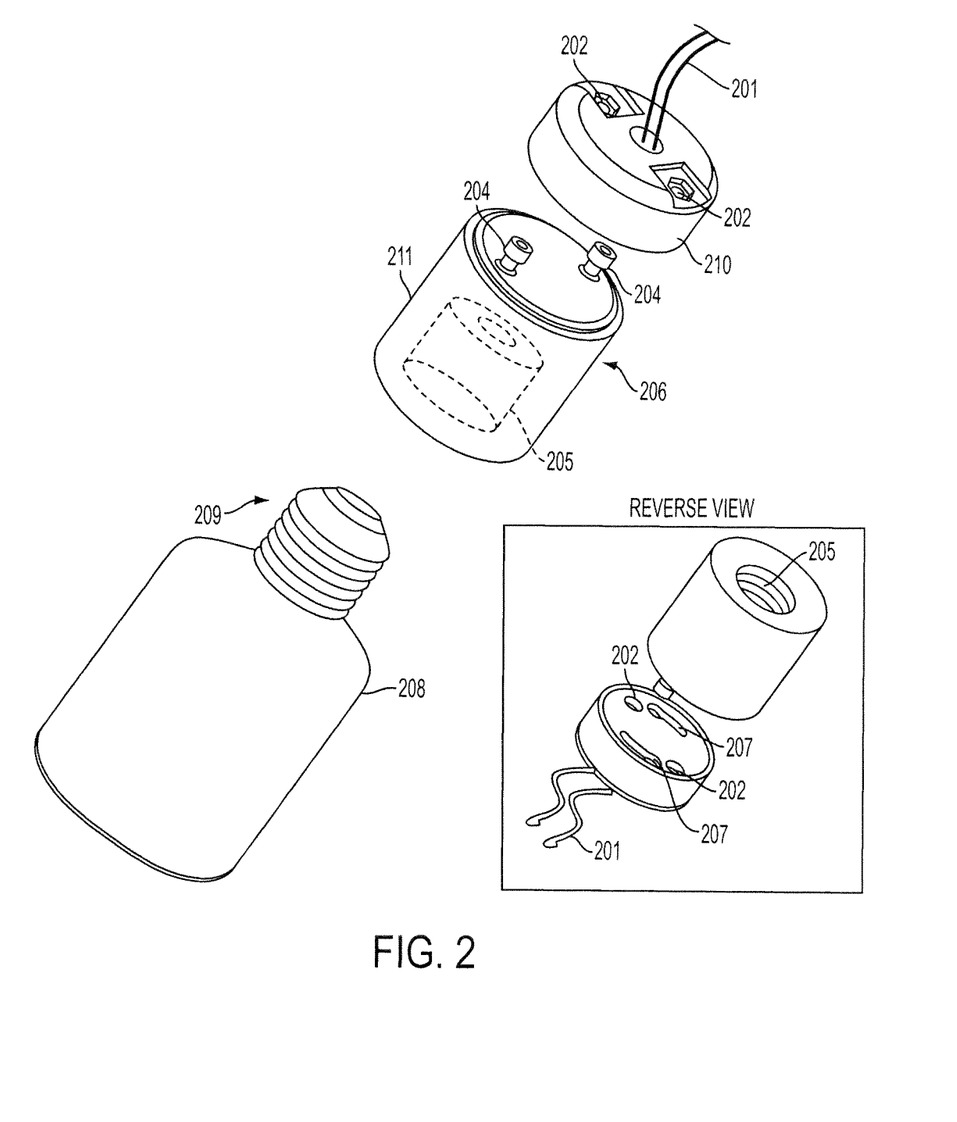
FIG. 2 shows another exemplary view of a socket adaptor according to one embodiment of the present disclosure, together with an LED light bulb and a lamp holder.

FIG. 2 shows another exemplary view of a socket adaptor according to one embodiment of the present disclosure, together with an LED light bulb and a lamp holder. In this example, a GU standard base, e.g., GU-24, is utilized. A GU standard base socket adapter 206 includes an AC-DC convertor/power supply. An LED lamp 208 having an LED lamp screw base (e.g., an external thread) 209 is connectable to one end of the socket adaptor 206. The other end of the socket adaptor 206 is connectable to a GU lamp holder 210 which is connected to an AC mains supply through power cable 201.

The GU lamp holder 210 has recesses (e.g., a lamp socket) 207, and fixing holes 202 for fixing the GU lamp holder 210 to, for example, a ceiling.

The socket adaptor 206 includes a socket body 211 having an adaptor base (e.g., an internal thread) 205 for receiving the LED lamp screw base 209 and prongs (i.e., a GU base) 204 for attaching the socket adaptor 206 to the recesses 207 of the lamp holder 210. The socket adaptor 206 includes a built-in AC-DC convertor so that the AC power provided through the lamp holder 210 is converted to DC power for driving the LED lamp 208.

Figure 3:
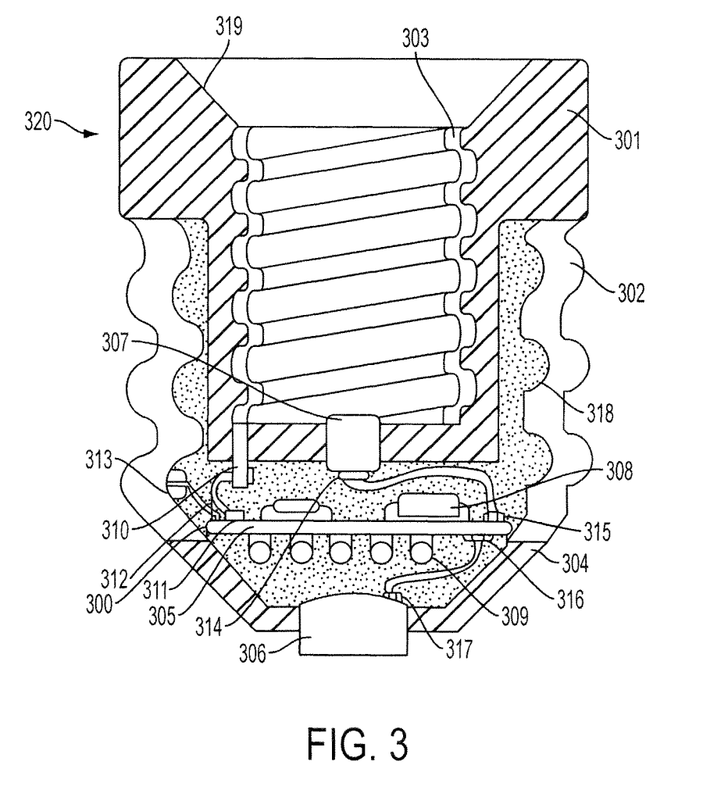
FIG. 3 shows an exemplary cross sectional view of a socket adaptor according to one embodiment of the present disclosure.

FIG. 3 shows an exemplary cross sectional view of a socket adaptor according to one embodiment of the present disclosure. More specifically, FIG. 3 illustrates a structure of an exemplary socket adapter 320 with a built-in AC-DC convertor (DC power supply) circuit 300.

The socket adaptor 320 includes an adaptor housing 301 having an internal screw socket (an internal thread) 303 for receiving an LED lamp. The opening part of the adaptor housing 301 has a tapered edge 319. The other end of the socket adaptor has a portion having a smaller diameter, on which a screw base 302 (an external thread) functioning as one external electrode is attached by using a potting material 318. A screw base contact 306 functioning as the other external electrode is disposed at the bottom of the socket adaptor 320. The screw base 302 is insulated from the screw base contact 306 by a screw base insulation 304. The screw base insulation includes, but not limited to, ceramics or high temperature-resistant plastics.

The screw socket 303 is made of a conductive material (e.g., metal) and functions as one inner electrode. A screw socket contact 307 is disposed on the bottom of the opening part of the adaptor housing 301 and functions as the other inner electrode. The screw socket 303 is insulated from the screw socket contact 307 by a part of the adaptor housing 301.

Inside the socket adaptor 320, the AC-DC convertor 300 is disposed. The AC-DC convertor 300 includes a circuit board 305 having an upper surface on which upper surface components 308 are disposed and a lower surface on which lower surface components 309 are disposed. The AC-DC convertor 300 includes a diode-based rectifier and a wave-shaping circuit, and may be configured to provide a pulsed DC current or a constant DC current. For example, as disclosed in US 2010/0109558, a full-wave rectifier (e.g., MB6S provided by Fairchild Semiconductor) and a current limiting diode (e.g., CMJH180 provided by Central Semiconductor) may be utilized in the AC-DC convertor 300. Optionally, a voltage surge suppressor (e.g., varistor TVR14241 provided by TKS, Thinking Electronics Industrial Co. Ltd) or an over-current protection device (e.g., a resettable fuse 60R010 provided by Littlefuse) may also be utilized.

The AC-DC convertor 300 is disposed in the socket adaptor 320 at the bottom of the socket adaptor 320, preferably within a space between the bottom of the adaptor housing 301 and screw base contact 306. Preferably, the AC-DC convertor 300 is sealed in the socket adaptor 320 by the potting material 318. The potting material is an insulating material, for example, epoxy or silicone.

The AC-DC convertor 300 is configured to receive the AC power from the lamp holder via the screw base 302 and the screw base contact 306, and to provide the converted DC power to the LED lamp via the screw socket 303 and the screw socket contact 307. The circuit board 305 and the screw socket 303 is connected by a PCB (print-circuit board) connection 311, a screw socket connection 310 and a wiring therebetween, and the circuit board 305 and the screw socket contact 307 is connected by a PCB connection 315, a screw base connection 314 and a wiring therebetween. The circuit board 305 and the screw base 302 is connected by a PCB connection 312, a screw base connection 313 and a wiring therebetween, and the circuit board 305 and the screw base contact 306 is connected by a PCB connection 316, a screw base connection 317 and a wiring therebetween.

The AC voltage may be 100-277 V (e.g., 100, 110, 120, 230, 240 or 277 V). After rectification and current limiting action, the DC voltage to the LED is the AC rms value less than the rms value drop across the rectifier and the current limiting diodes. The output DC may be a DC pulse, and the DC level varies with the time cycle (e.g., a frequency of 120 Hz or 100 Hz) depending on the AC input frequency. The frequency of the DC pulse is doubled due to the full-wave rectification.

Figure 4:
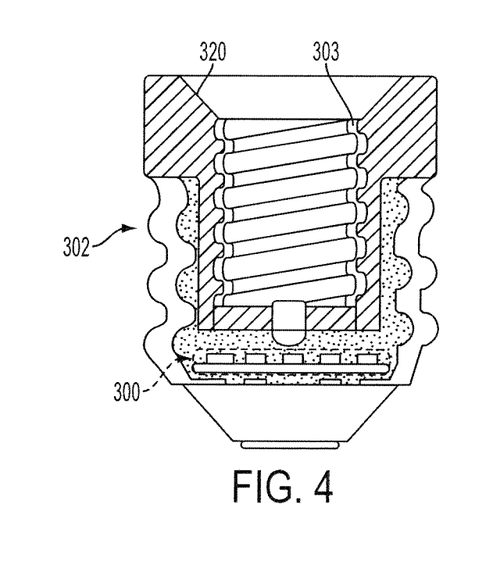
FIG. 4 shows an exemplary cross sectional view of a socket adaptor according to one embodiment of the present disclosure.
Figure 5:
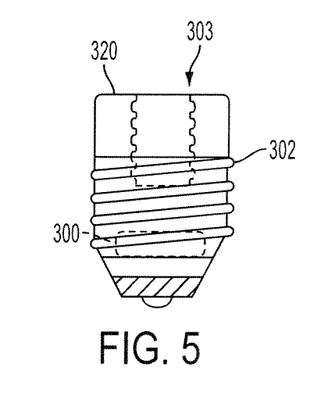
FIG. 5 shows an exemplary cross sectional view of a socket adaptor according to one embodiment of the present disclosure.

As shown in FIGS. 3-5, since the AC-DC convertor is disposed at a bottom of the socket adaptor, the size of the socket adaptor becomes smaller and the heat transfer from the power supply to the LED lamp can be suppressed.

Figure 6:
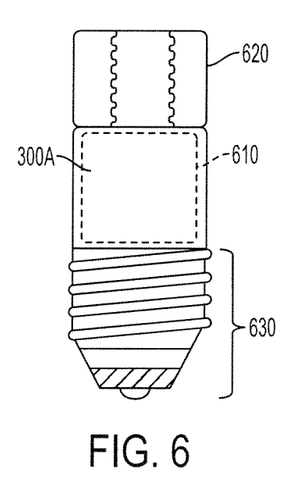
FIG. 6 shows another exemplary cross sectional view of a socket adaptor according to one embodiment of the present disclosure.

FIG. 6 shows another exemplary cross sectional view of a socket adaptor according to one embodiment of the present disclosure. FIG. 6 illustrates a structure of a socket adapter with a non-compact AC-DC power supply 300A. In this example, the AC-DC convertor is disposed in an intermediate housing 610. The screw socket 620 and the screw base 630 are disposed at the respective ends of the intermediate housing 610.

Figure 7:
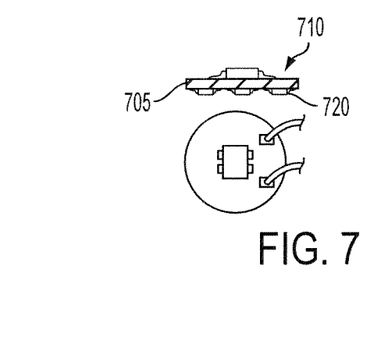
FIG. 7 shows an exemplary view of an AC-DC convertor printed circuit board according to one embodiment of the present disclosure.
Figure 8:
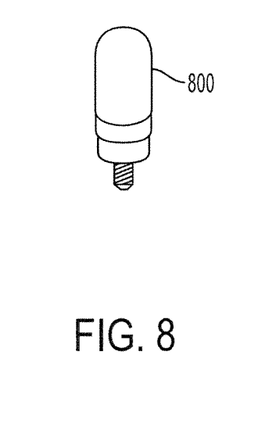
FIG. 8 shows an LED lamp used with the socket adapter.

FIG. 7 shows an exemplary view of an AC-DC convertor (DC power supply) printed circuit board according to one embodiment of the present disclosure. On a circuit board 705, a rectifier 710 is disposed. The surface mountable current diodes (SMD CLDs) 720 are also disposed on the circuit board 705, preferably, on the opposite side of the rectifier 710. The PCB in one embodiment includes surface mountable devices including current limiting diodes, bridge rectifier diodes, an optional voltage surge suppressor in the form of varistor and/or an optional over-current protection device in the form of thermistor. In another embodiment, the devices are through-hole devices, or a mixture of the surface mountable devices and thorough-hole devices. Preferably, the circuit board 705 is circular.

Figure 9:
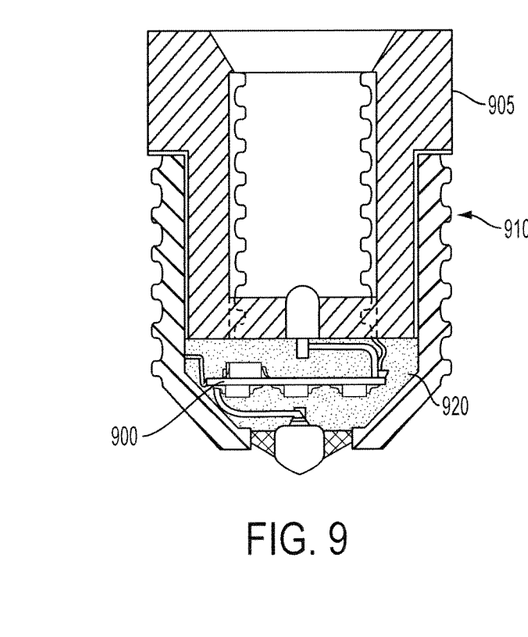
FIG. 9 shows another exemplary cross sectional view of a socket adaptor according to one embodiment of the present disclosure.

FIG. 9 shows another exemplary cross sectional view of a socket adaptor for receiving an LED lamp 800 according to one embodiment of the present disclosure. In this example, the AC-DC convertor 900 is sealed with a potting material 920, such as, for example, epoxy or silicone.

Figure 10:
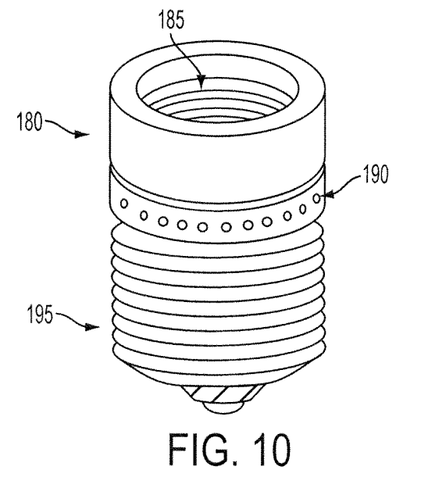
FIG. 10 shows another exemplary view of a socket adaptor according to one embodiment of the present disclosure.

FIG. 10 shows another exemplary view of a socket adaptor according to one embodiment of the present disclosure. In this example, crimping dimples 190 are disposed on an external screw base 195 of the socket adapter 180. The crimping dimples 190 make it easier to attach an external screw base 195 to an internal screw socket 185.

Figures 11, 13:
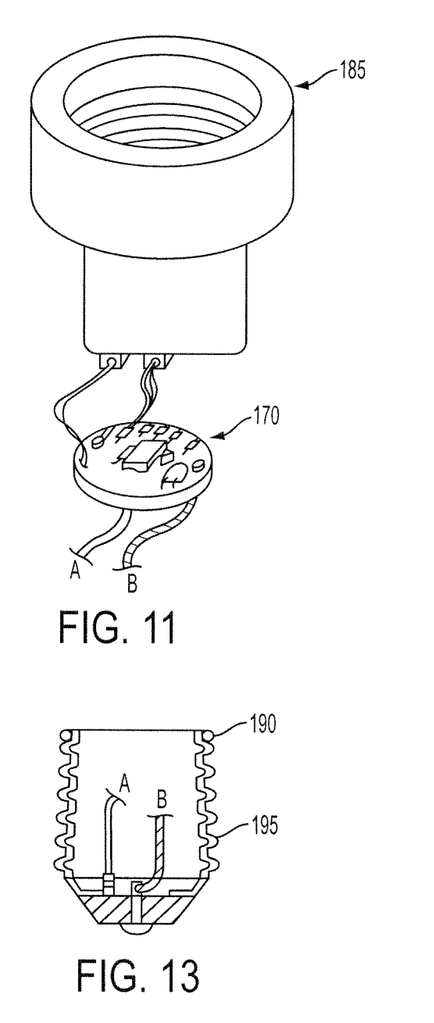
FIG. 11 shows an exemplary internal structure of a socket adaptor according to one embodiment of the present disclosure.
FIG. 13 shows an example of a cross sectional view of an attachment of the power supply wires to the screw base metal housing.
Figure 12:
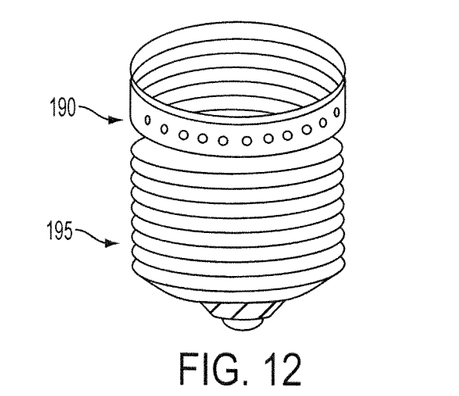
FIG. 12 shows an example of a metal piece-part that forms the screw base metal housing part of the socket adapter.
Figure 14:
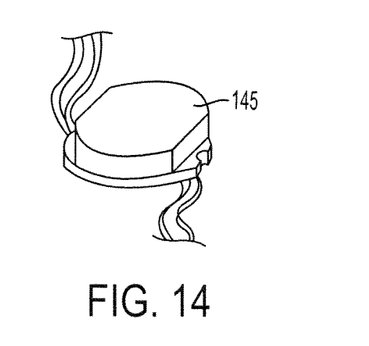
FIG. 14 shows an example of a power convertor module.

FIGS. 11-13 show assembling of the socket adaptor according to one embodiment of the present disclosure. An AC-DC convertor (DC power supply) unit 170 is connected to the internal screw socket 185 by wirings. Then, the AC-DC convertor unit 170 is connected to the screw base 195 by wirings. After injecting a potting material inside the external screw base 195, the external screw base is attached to the internal screw socket, thereby sealing the AC-DC convertor unit 170 inside the external screw base 195. As shown in FIG. 14, an AC-DC convertor circuit may be molded into an insert-molded unit 145 in advance.

Figure 15:
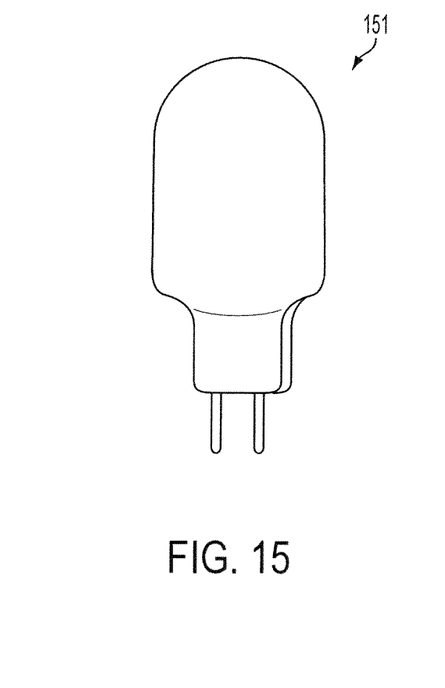
FIG. 15 shows an LED lamp as a replacement for a halogen lamp, with a 2-pin connection.
Figure 16:
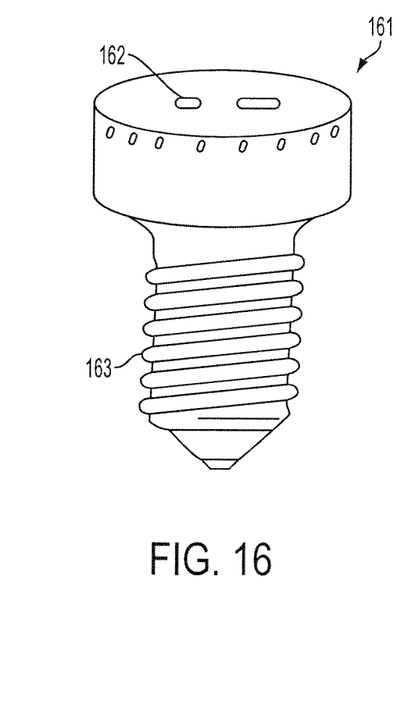
FIG. 16 shows an example of a socket adapter having a 2-pin socket and a screw base according to on embodiment of the present disclosure.
Figure 17:
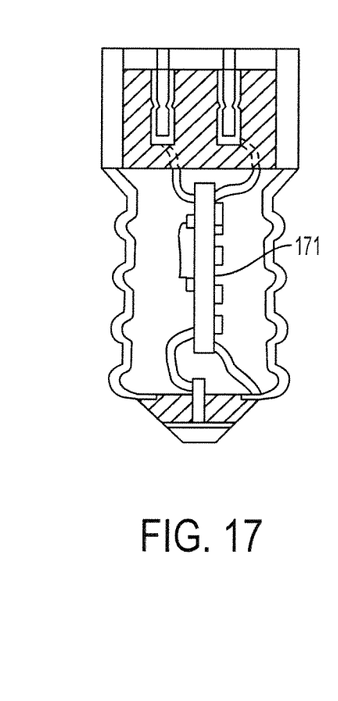
FIG. 17 shows an example of a cross sectional view of the socket adaptor of FIG. 16.
Figure 19:
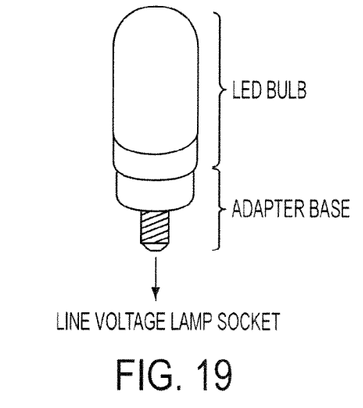
FIG. 19 shows the use of the socket adapter according to the present disclosure on an LED lamp.

Various types of LED lamps, sockets or bases may be utilized for the socket adaptor of the present disclosure. For example, when the LED lamp 151 has a bi-pin connector as shown in FIG. 15, the socket adaptor may be the one as shown in FIGS. 16 and 17. The socket adaptor 161 includes a bi-pin receiver 162 and an external screw 163. Inside the socket adaptor, an AC-DC convertor 171 is disposed. The LED lamp 151 is attached to the socket adaptor 161, and then the socket adaptor 161 is attached to the lamp holder as shown in FIG. 19.

Figure 18:
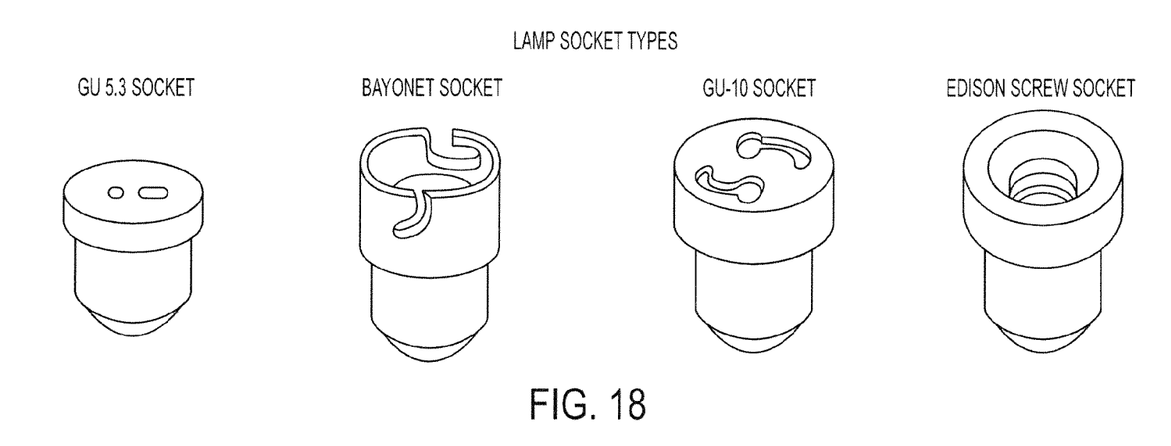
FIG. 18 shows various types of lamp sockets.
Figure 20:
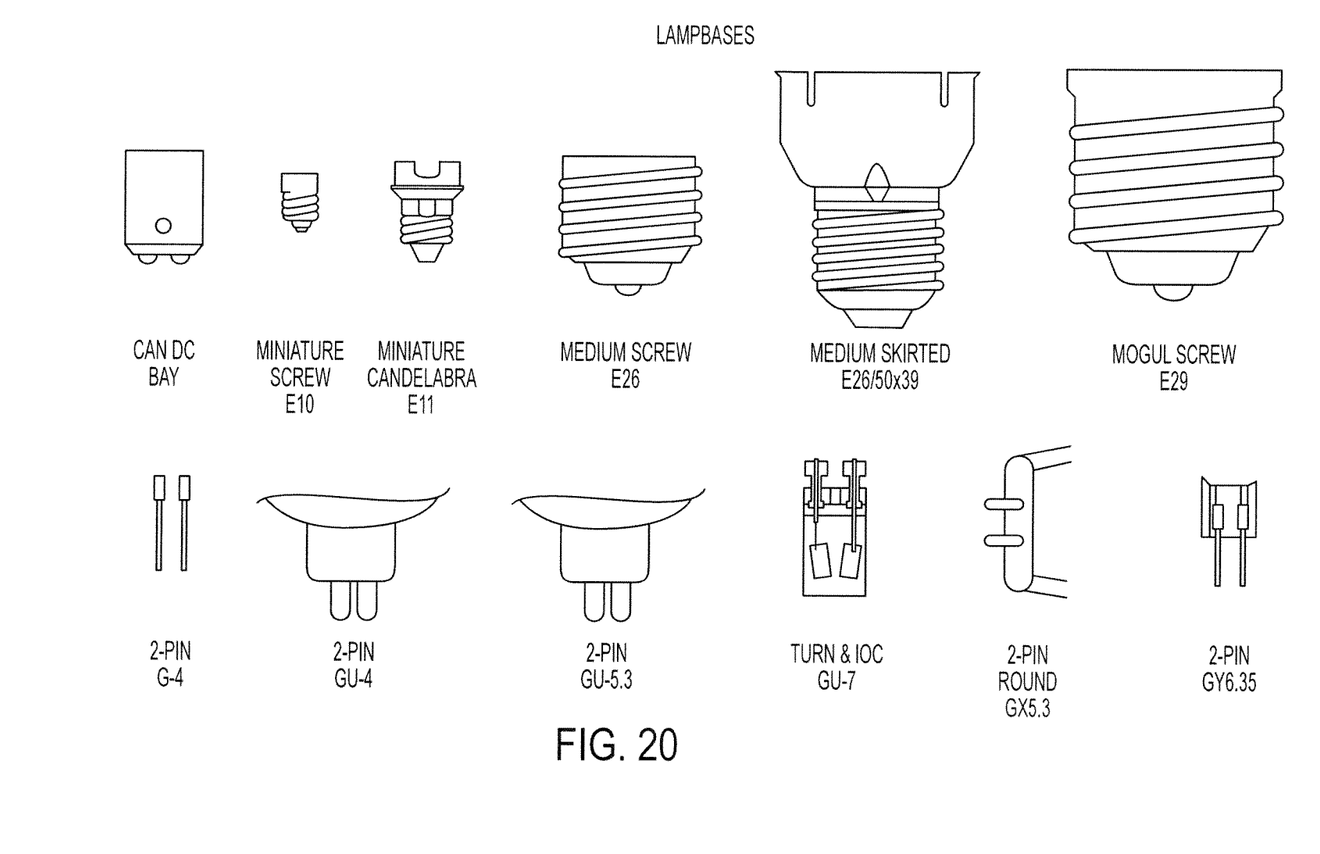
FIG. 20 shows various types of lamp bases.

The shape and configuration of a holder portion for receiving an LED lamp may be any types of lamp sockets according to the industrial standard as shown in, for example, FIG. 18. For example, GU type sockets, bayonet sockets or Edison screw sockets may be utilized. The shape and configuration of an attachment portion for attaching the socket adaptor to the lamp holder may also be any types of lamp bases according to the industrial standard as shown in, for example, FIG. 20. For example, any Edison screw bases (E-types), a can DC bay, bi-pin GU bases, GX bases or GY bases may be utilized.

One of the advantages the socket adaptor of the present disclosure is that an LED lamp does not require its own built-in AC-DC power convertor and does not require a separate cable-attached AC-DC power convertor. Further, the socket adaptor having the AC-DC convertor enables a cooling function of the LED lamp by arranging the AC-DC power convertor, away from the LED lamp, inside the socket adapter. When the base of the socket adapter is attached to the socket connected to the AC power supply, the heat generated by the power supply can be dissipated through the adapter's connection to the AC power socket.

Further, another advantage of the present socket adaptor is that one socket adapter can be used for different LED lamps. By separating the socket adapter, which includes the AC-DC power convertor, from the LED lamps itself, high volume manufacturing of a standard part can be realized and thus the manufacturing cost can be reduced. It also helps to simplify inventory management.

Another advantage is that even if the AC-DC power convertor fails, the LED lamps can still continue to be used by only replacing the socket adapter. Conversely, if the LED lamp fails, the socket adaptor can still be used by simply replacing the failed LED lamp with a new LED lamp, which lowers replacement costs.

Yet another advantage of separating the AC-DC power convertor from the LED lamp is that different specifications of the AC-DC power convertor (e.g., different DC voltages) can be used for the same lamp. For example, a customer may want to use a higher wattage power supply to get more lumen output from the LED lamps. Another customer may want a high efficacy lamp but accepting a lower lumen output. By giving selection of the suitable socket adaptor in view of the LED lamps, the same product can meet the needs of different users.

The use of the socket adapter with an AC-DC power convertor is also advantageous for a drop-in replacement of halogen lamps that is powered up by directly using the AC power. Halogen lamp fixtures include various types of sockets including screw sockets and GU-type sockets. By utilizing the present socket adapter, a common LED lamp can be retrofitted into the various types of halogen lamp sockets.

Similarly, the LED lamps are frequently retrofitted into existing incandescent lamp sockets having various shapes. To meet all the needs of different sockets, it would be necessary to make as many types of LED lamps in view of the various types of socket in the market. However, by utilizing the present socket adaptor having a standard base, the LED lamp can be used in the different types of lamp sockets, which makes it easier for the user to replace the incandescent lamp with an energy efficient LED lamp.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

We claim:

1. A socket adaptor, comprising:
an adaptor body; and
an AC-DC converter, wherein:
the adaptor body includes a holder having only one internal thread for receiving an external thread of an LED lamp,
the only one internal thread is electrically connected to the AC-DC converter, and
the AC-DC converter is disposed in a space formed by the only one internal thread and the adaptor body.

2. The socket adaptor of claim 1, wherein the adaptor body further includes an external thread for attaching the socket adaptor to a lamp socket.

3. The socket adaptor of claim 2, wherein:
the adaptor body further includes an outer base contact disposed at an end of the socket adaptor, and
the outer base contact and the external thread are configured to receive AC power.

4. The socket adaptor of claim 2, wherein the external thread has crimping dimples.

5. The socket adaptor of claim 2, wherein the external thread is electrically connected to the AC-DC convertor.

6. The socket adaptor of claim 1, wherein:
the holder further includes an inner base contact, and
the inner base contact and the internal thread are configured to provide DC power to the LED lamp.

7. The socket adaptor of claim 1, wherein:
the AC-DC convertor includes a diode-based rectifier and a wave-shaping circuit, and
the AC-DC convertor is configured to provide a pulsed DC current.

8. The socket adapter of claim 7, wherein the AC-DC convertor further includes a voltage surge protector and an over-current limiter.

9. The socket adaptor of claim 1, wherein:
the AC-DC convertor is disposed on a circuit board, and
the circuit board is sealed by an insulating material disposed in the adaptor body.

10. The socket adaptor of claim 9, wherein the insulating material is selected from the group consisting of epoxy and silicone.

11. The socket adaptor of claim 9, wherein the insulating material in in contact with a surface of the circuit board.

12. A lamp system, comprising:
the socket adaptor of claim 1; and
an LED lamp coupled to the only one internal thread of the socket adaptor,
wherein the LED lamp is driven by a DC current provided by the socket adaptor.

13. The socket adaptor of claim 1, wherein the adaptor body includes an external base for attaching the socket adaptor to a lamp holder, the external base being configured according to industrial standards.

14. A socket adaptor, comprising:
an adaptor body;
an AC-DC converter disposed in the adaptor body; and
a GU standard base for attaching the socket adaptor to a GU standard lamp socket, wherein:
the adaptor body includes a holder having only one internal thread for receiving an external thread of an LED lamp,
the only one internal thread is electrically connected to the AC-DC converter, and
the GU standard base includes a first T-shape terminal and a second T-shape terminal extending from a bottom of the adaptor body located at an opposite position to an opening of the only one internal thread and configured to receive AC power.

15. The socket adaptor of claim 14, wherein the AC-DC converter is disposed in a space formed by the only one internal thread and the adaptor body.

16. The socket adaptor of claim 15, wherein:
the AC-DC convertor is disposed on a circuit board,
the circuit board is sealed by an insulating material in the adaptor body,
the insulating material in in contact with an surface of the circuit board, and
the insulating material is selected from the group consisting of epoxy and silicone.

17. The socket adaptor of claim 14, wherein:
the holder further includes an inner base contact, and
the inner base contact and the internal thread are configured to provide DC power to the LED lamp.

18. A socket adaptor, comprising:
an adaptor body;
an AC-DC converter; and
a GU standard base for attaching the socket adaptor to a GU standard lamp socket, wherein:
the adaptor body includes a bi-pin holder having two holes for receiving a bi-pin electrode of an LED lamp, the bi-pin holder being disposed at a first face of the adaptor body, and
the GU standard base includes a first T-shape terminal and a second T-shape terminal extending from a bottom of the adaptor body located at a second face of the adaptor body opposite to the first face of the adaptor body, and configured to receive AC power.

19. The socket adaptor of claim 18, wherein the AC-DC converter is disposed in a space formed by the bi-pin holder and the GU standard base.

20. The socket adaptor of claim 19, wherein:
the AC-DC convertor is disposed on a circuit board,
the circuit board is sealed by an insulating material in the adaptor body,
the insulating material in in contact with an surface of the circuit board, and the insulating material is selected from the group consisting of epoxy and silicone.

* * * * *